May 24, 1949.  M. HAIN  2,470,814

ELECTRICAL CABLE SUPPORT OR RACK

Filed March 4, 1948

INVENTOR.
MAX HAIN.
BY Archworth Martin
his ATTORNEY

Patented May 24, 1949

2,470,814

UNITED STATES PATENT OFFICE 2,470,814

ELECTRICAL CABLE SUPPORT OR RACK

Max Hain, Pittsburgh, Pa.

Application March 4, 1948, Serial No. 13,027

2 Claims. (Cl. 248—49)

This invention relates to hangers and more particularly to those of the type suitable for supporting electric cables, and is a modification of the invention disclosed in my application Serial No. 5,584, filed January 31, 1948.

One object of my invention is to provide a bracket or supporting structure for a plurality of cables, of such form that the cables on each bracket are so positioned relative to one another that although they are somewhat compactly arranged, an upper cable will not sag upon any cable supported by the bracket at a lower plane.

Another object of my invention is to provide a simple and compact form of bracket structure for supporting cable insulators, but wherein the clamps for supporting the insulator bushings are so displaced from one another in vertical and horizontal directions as to permit of convenient access thereto by workmen.

Figure 1:
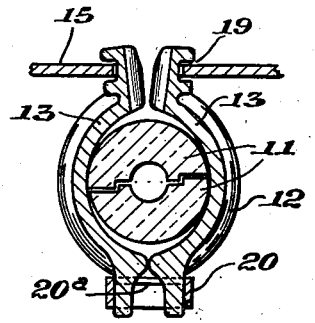
Figure 2:
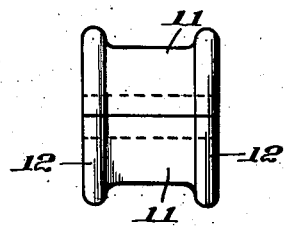
Figure 3:
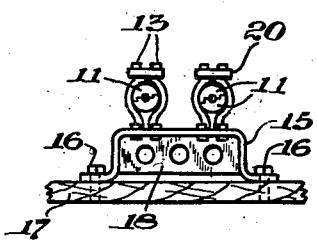
Figure 4:
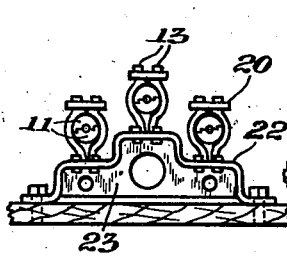
Figure 5:
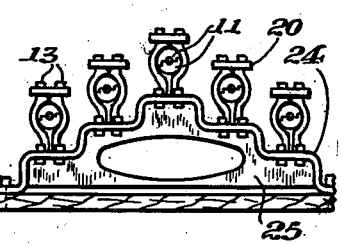
Figures 6, 11:
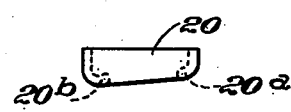
Figure 12:
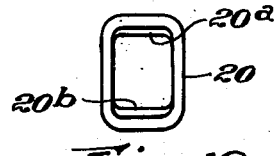
Figure 7:
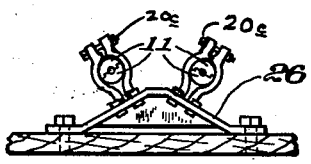
Figure 8:
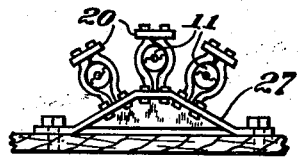
Figure 9:
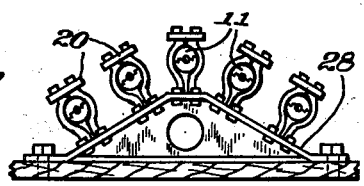
Figure 10:
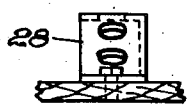

Some of the forms which my invention may take are shown in the accompanying drawings wherein Figure 1 is a sectional view on an enlarged scale showing the manner in which insulator bushings of a standard form are supported by the hangers; Fig. 2 is a side view of the insulator of Fig. 1; Fig. 3 shows one form of bracket for supporting two cables; Fig. 4 shows the bracket modified to support three cables, as for example the three cables of a three-phase system; Fig. 5 shows the bracket enlarged to support five cables; Fig. 6 is an edge view of the bracket of Fig. 5; Figs. 7, 8 and 9 show a different type of bracket than that of Figs. 3, 4 and 5, for supporting two cables, three cables and five cables respectively; Fig. 10 is an edge view of the bracket of Fig. 9; Fig. 11 is a side view of one of the clamping rings for the bracket clamps, and Fig. 12 is a plan view thereof.

It will be understood that the brackets of Figs. 3 to 5 and the bracket of the type shown in Figs. 7 to 9 can be enlarged to support a greater number of cables than five.

The brackets are here shown as employed in supporting insulating bushings 11 that are made in halves and have enlarged ends 12, together with their clamping elements or yokes 13, these members being of a form well known in the art.

In Fig. 3, I show a bracket 15 that is mainly of strap-like form, connected at its ends by bolts or screws 16 to a girder or beam 17, that usually will be in approximately a horizontal plane. A stiffening plate 18 is provided for stiffening the member 15 which back wall may be cast integrally with or welded to the strap-like portion 15 of the bracket. Where the weight to be supported is not very great, this back plate or wall 18 can be omitted.

The clamping members 13 have ribs or grooves formed in their base portions, at 19 for engagement with the bracket. The base portions of these members 13 are drawn together and inserted through the hole in the bracket, whereupon their outer ends are drawn together in loosely embracing relation to the insulator elements 11 and a retaining ring 20 placed thereon, the ring 20 having yieldable and snap engagement with these outer extensions of the members 13. The rings 20 have beads or shoulders at 20a and 20b, which will engage in complemental grooves in the edges of the clamping members 13. Bolts 20c can be used instead of the rings 20, as shown in Fig. 7.

In Fig. 4, I show a bracket 22 of stepped form for supporting three insulating bushings, as for example bushings for a 3-phase cable system. This stepped arrangement facilitates the placing of the cable supports by a workman, because each pair of bushing clamps is located in such vertical and horizontal offset relation to the adjacent pair of clamps that there is a minimum of interference by one clamp with the operation of installing the adjacent clamp and its bushing. Also, as in the case of Fig. 3, the strap-like form of the bracket member 22 and its back plate 23 gives adequate strength with a smaller amount of metal than is required in brackets of other forms.

In Fig. 5, the bracket 24 having a back plate 25 is of the same general form as the structure of Fig. 4 but is enlarged to provide support for five cables. In Figs. 7, 8 and 9, I show brackets 26, 27 and 28 respectively, bent along sloping lines instead of being stepped and having clamp-receiving holes formed thereon on horizontal surfaces as in Figs. 3 to 5.

By placing all of the insulator supports on one side of the bracket, which in this case is the upper or outer side, there will not be electrical induction that would interfere with the current flow or voltage in the conductors, or excessive heating of the conductors, as is frequently the case where 3-phase conductor supports are placed on both the inner and outer sides of a supporting rack.

The various brackets that support the clamps and insulator bushings can suitably be of malleable iron, or of aluminum. The clamps 13 of each pair can both be of malleable iron, where cables for D. C. current are to be supported, or one be of brass and the other of malleable iron, for A. C. current.

I claim as my invention:

1. A cable hanger comprising a bracket member that is adapted to be connected at its base portion to a girder or wall, the body portion being provided with holes, supporting members each comprising a pair of bowed clamping elements adapted to receive an insulating bushing between their mid portions, the inner ends of each pair of said elements having shoulders formed thereon that extend through one of the holes and make interlocking engagement with the bracket member, and means for connecting together the outer ends of each pair of clamping elements, the bracket being of generally bowed form but having flattened areas through which the holes extend.

2. A cable hanger comprising a bracket member that is adapted to be connected at its base portion to a girder or wall, the body portion being provided with holes, supporting members each comprising a pair of bowed clamping elements adapted to receive an insulating bushing between their mid portions, the inner ends of each pair of said elements having shoulders formed thereon that extend through one of the holes and make interlocking engagement with the bracket member, means for connecting together the outer ends of each pair of clamping elements, the bracket being of generally bowed form but having flattened areas through which the holes extend, and the flattened areas on each side of the bracket being angularly disposed relative to those on the other side.

MAX HAIN.

REFERENCES CITED

The following references are of record in the file of this patent:

UNITED STATES PATENTS

| Number | Name | Date |
|---|---|---|
| 325,767 | Prior | Sept. 8, 1885 |
| 491,362 | Lane | Feb. 7, 1893 |
| 1,354,920 | Seiler | Oct. 5, 1920 |
| 1,616,360 | Foster | Feb. 1, 1927 |
| 2,003,159 | Taylor | May 28, 1935 |
| 2,179,406 | Fitzpatrick | Nov. 7, 1939 |